(12) United States Patent
Guen et al.

(10) Patent No.: US 9,299,976 B2
(45) Date of Patent: Mar. 29, 2016

(54) SECONDARY BATTERY INCLUDING A CAP PLATE COMPRISING AN INVERSION PLATE

(71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 248 days.

(21) Appl. No.: 14/037,333

(22) Filed: Sep. 25, 2013

(65) Prior Publication Data

US 2014/0315056 A1 Oct. 23, 2014

(30) Foreign Application Priority Data

Apr. 22, 2013 (KR) .......................... 10-2013-0044241

(51) Int. Cl.
| | |
|---|---|
| *H01M 2/20* | (2006.01) |
| *H01M 2/30* | (2006.01) |
| *H01M 2/34* | (2006.01) |
| *H01M 2/04* | (2006.01) |
| *H01M 2/06* | (2006.01) |
| *H01M 2/08* | (2006.01) |

(52) U.S. Cl.
CPC ............ *H01M 2/345* (2013.01); *H01M 2/0473* (2013.01); *H01M 2/06* (2013.01); *H01M 2/08* (2013.01); *H01M 2/30* (2013.01)

(58) Field of Classification Search
CPC ..... H01M 2/345; H01M 2/0473; H01M 2/30; H01M 2/08; H01M 2/06
See application file for complete search history.

(56) References Cited

U.S. PATENT DOCUMENTS

| | | | |
|---|---|---|---|
| 2006/0093907 A1* | 5/2006 | Jeon et al. | 429/180 |
| 2006/0117701 A1* | 6/2006 | Kajimura | 52/650.1 |
| 2009/0253027 A1 | 10/2009 | Yang et al. | |
| 2011/0183198 A1 | 7/2011 | Byun et al. | |
| 2011/0300435 A1* | 12/2011 | Byun | 429/178 |
| 2012/0183818 A1 | 7/2012 | Byun et al. | |

FOREIGN PATENT DOCUMENTS

| | | |
|---|---|---|
| KR | 2007/0110567 A | 11/2007 |
| KR | 2011/0087566 A | 8/2011 |
| KR | 2012/0089983 A | 8/2012 |

* cited by examiner

*Primary Examiner* — Kenneth Douyette
(74) *Attorney, Agent, or Firm* — Lewis Roca Rothgerber Christie LLP (57) ABSTRACT

A secondary battery includes an electrode assembly; a case accommodating the electrode assembly; a cap plate sealing the case and having an inversion plate; and an insulation plate having a short-circuit hole generally corresponding to the inversion plate and an air opening spaced from the short-circuit hole and fluidly connected to a top surface of the cap plate; a terminal plate coupled to a top surface of the insulation plate and electrically connected to the electrode assembly; and a terminal assembly including a sealing member coupled to a bottom surface of the insulation plate and formed to encompass the short-circuit hole and the air opening.

13 Claims, 7 Drawing Sheets

SECONDARY BATTERY INCLUDING A CAP PLATE COMPRISING AN INVERSION PLATE

CROSS-REFERENCE TO RELATED APPLICATION

This application claims priority to and the benefit of Korean Patent Application No. 10-2013-0044241, filed on Apr. 22, 2013, the entire content of which is incorporated herein by reference.

BACKGROUND

1. Field

Aspects of the present invention relate to a secondary battery.

2. Description of the Related Art

Unlike a primary battery which cannot be recharged, a secondary battery can be repeatedly charged and discharged. Low capacity batteries that use single battery cells are used as power sources for various portable small-sized electronic devices such as cellular phones, and camcorders. High power batteries that use tens of battery cells connected to each other in a battery pack are used as power sources for electric scooters, hybrid vehicles or electric vehicles.

Secondary batteries may be manufactured as various types such as cylindrical and prismatic batteries. A secondary battery is generally configured by accommodating an electrode assembly having a positive plate and a negative plate and a separator as an insulator located therebetween in a case with an electrolyte and installing a cap plate having electrode terminals in the case.

Sometimes a secondary battery may undergo accelerated deterioration due to a short-circuit caused by condensed dew penetrating into the secondary battery, and thereby the capacity of the secondary battery may be reduced. In addition, internal components of the secondary battery are prone to corrosion due to dew condensation.

SUMMARY

Aspects of the present invention provide a secondary battery which can prevent deterioration and capacity reduction by preventing short circuiting due to penetration of dew condensation.

Other aspects of the present invention provide a secondary battery, which can prevent corrosion of internal components due to penetration of dew condensation.

In accordance with one aspect of the present invention, there is provided a secondary battery including an electrode assembly, a case accommodating the electrode assembly, a cap plate sealing the case and including an inversion plate, an insulation plate including a short-circuit hole corresponding to the inversion plate and an air hole spaced apart from the short-circuit hole and coupled to a top surface of the cap plate, a terminal plate coupled to a top surface of the insulation plate electrically connected to the electrode assembly, and a terminal assembly coupled to a bottom surface of the insulation plate and formed to surround the short-circuit hole and the air hole.

The sealing member may include a sealing ring surrounding the edge of the short-circuit hole, a rib extending from one side of the sealing ring so as to surround the edge of the air hole, and a protrusion part protruding from the edge of the rib to have a predetermined height.

The sealing ring and the protrusion part may have the same height.

A channel may be formed at a central region of the protrusion part.

In addition, a channel disposed toward the air hole is formed in the protrusion part.

The protrusion part may have an 'H' shape.

The sealing member may further include a protruding extension part protruding from the protrusion part to the opposite side of the short-circuit hole.

The sealing member may further include a sealing wall coupled to the outer surface of the insulation plate.

The sealing member may be formed of a thermoplastic elastomer.

The cap plate may include at least one coupling groove formed on its top surface, and the insulation plate may include at least one coupling protrusion formed on a region of its bottom surface corresponding to the at least one coupling groove.

The insulation plate may include at least one coupling hole formed on its inner surface, and the first terminal plate may include at least one coupling protrusion formed at a region of its outer surface corresponding to the at least one coupling hole.

The secondary battery may further include a fastening shaft electrically connected to the electrode assembly through a current collector plate, and the fastening shaft may be electrically connected to the terminal plate.

The fastening shaft may be riveted on the top surface of the terminal hole of the terminal plate.

The inversion plate may include a downwardly convex round part and an edge part fixed to the insulation plate.

As described above, deterioration and capacity reduction of the secondary battery according to the embodiment of the present invention can be prevented by preventing short circuiting due to penetration of dew condensation.

In addition, corrosions of internal components of the secondary battery according to the embodiment of the present invention can be prevented.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can easily be made and used by those skilled in the art.

As used herein, the term "and/or" includes any and all combinations of one or more of the associated listed items. In addition, the terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring to FIGS. 1 to 4, the secondary battery 1000 according to the embodiment of the present invention includes an electrode assembly 100, a case 200, a cap assembly 300, a first terminal assembly 400 and a second terminal assembly 500.

Figure 2:
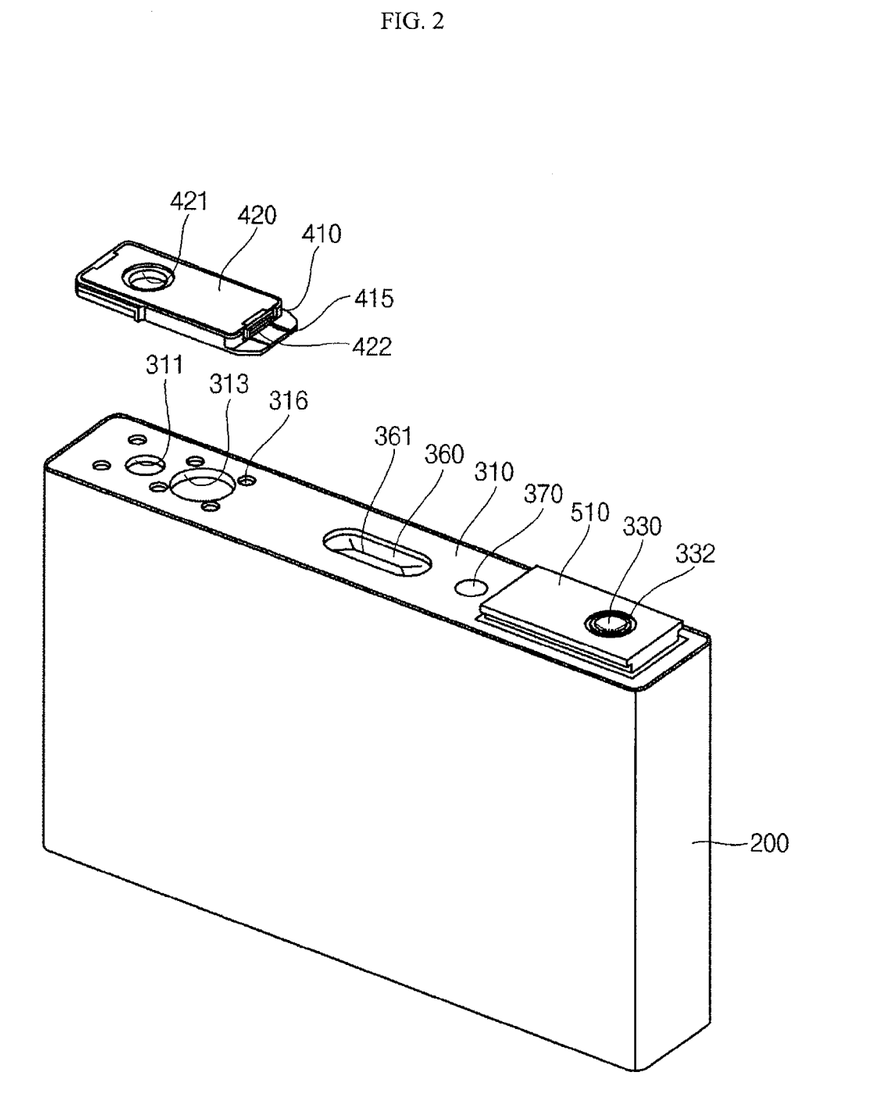
FIG. 2 is an exploded perspective view illustrating a case and a first terminal assembly of the secondary battery shown in FIG. 1.

The electrode assembly 100 is formed by winding or laminating a stacked structure including a first electrode plate 110, a second electrode plate 120, and a separator 130, which are shaped of a thin plate or a thin foil. In one embodiment, the first electrode plate 110 functions as a negative electrode and the second electrode plate 120 functions as a positive electrode.

The first electrode plate 110 is formed by coating a first electrode active material such as a graphite or carbon on a first electrode current collector formed of a metal foil such as nickel or copper, and includes a first electrode uncoated portion 111 having no first electrode active material coated thereon. The first electrode uncoated portion 111 becomes a path of the flow of current between the first electrode plate 110 and the outside of the first electrode plate 110. However, aspects of the present invention are not limited to the materials of the first electrode plate 110 disclosed herein.

The second electrode plate 120 is formed by coating a second electrode active material such as transition metal oxide on a second electrode current collector formed of a metal foil made of aluminum, and includes a second electrode uncoated portion 121 having no second electrode active material coated thereon. The second electrode uncoated portion 121 becomes a path of the flow of current between the second electrode plate 120 and the outside of the second electrode plate 120. However, aspects of the present invention are not limited to the materials of the second electrode plate 120 disclosed herein.

In one embodiment, the first electrode plate 110 and the second electrode plate 120 may have different polarities.

The separator 130 is positioned between the first electrode plate 110 and the second electrode plate 120 to prevent an electric short circuit therebetween and to allow lithium ions to move. The separator 130 may be made of polyethylene, polypropylene or a composite film thereof. However, aspects of the present invention are not limited to the materials of the separator 130 disclosed herein.

A first current collector plate 10 and a second current collector plate 20 to be electrically connected to the first electrode plate 110 and the second electrode plate 120 are coupled to both ends of the electrode assembly 100.

The first current collector plate 10 is made of a conductive material such as nickel or the like and makes contact with the first electrode uncoated portion 111 protruding from one end of the electrode assembly 100 to then be electrically connected to the first electrode plate 110. The first current collector plate 10 may include a first connection part 11, a first extension part 12 and a first fastening hole 12a.

The first extension part 12 is bent and extends from an end of the first connection part 11 and is shaped of a plate substantially contacting the first electrode uncoated portion 111.

The first fastening hole 12a is formed at one side of the first extension part 12 and provides for a space of the first extension part 12, to which the first fastening shaft 320 of the cap assembly 300 is, fitted and coupled.

The second current collector plate 20 is made of a conductive material such as aluminum or the like and makes contact with the second electrode uncoated portion 121 protruding from one end of the electrode assembly 100 to then be electrically connected to the second electrode plate 120. The second current collector plate 20 may include a second connection part 21, a second extension part 22 and a second fastening hole 22a.

The second connection part 21, the second extension part 22 and the second fastening hole 22a of the second current collector plate 20 are substantially the same as the first connection part 11, the first extension part 12 and the first fastening hole 12a of the first current collector plate 10 in view of configurations and functions, and repeated descriptions will be omitted.

The case 200 is made of a conductive metal such as aluminum, an aluminum alloy, or nickel plated steel, and has a substantially rectangular parallelepiped prismatic shape having an opening for receiving the electrode assembly 100, the first current collector plate 10 and the second current collector plate 20. While an opening is not shown in FIG. 1 because the case 200 and the cap assembly 300 are coupled to each other, it will be appreciated that the case has a substantially opened portion configured to accommodate the periphery of the cap assembly 300. In one embodiment, the internal surface of the case 200 is insulated from the electrode assembly 100, the first current collector plate 10, the second current collector plate 20 and the cap assembly 300. In one embodiment, the case 200 may have a polarity, for example, a positive polarity.

The cap assembly 300 is coupled to the case 200. In detail, the cap assembly 300 may include the cap plate 310, the first fastening shaft 320, the second fastening shaft 330, a first gasket 340 and a second gasket 350. In addition, the cap assembly 300 may further include a vent plate 360, a plug 370, a first insulation member 380 and a second insulation member 390.

The cap plate 310 seals the opening of the case 200 and may be made of the same material as the case 200. Additionally, the cap plate 310 may have the same polarity as the case 200.

The cap plate 310 may have a first fastening hole 311, a second fastening hole 312, a first short-circuit hole 313, a vent hole 314, an electrolyte injection hole 315, a coupling groove 316 and an inversion plate 317. In one embodiment, the cap plate 310 may have the same polarity with the case 200.

The coupling groove 316 is formed on a top surface of the cap plate 310 and a first terminal assembly 400 to be described later is coupled thereto.

Figure 3A:
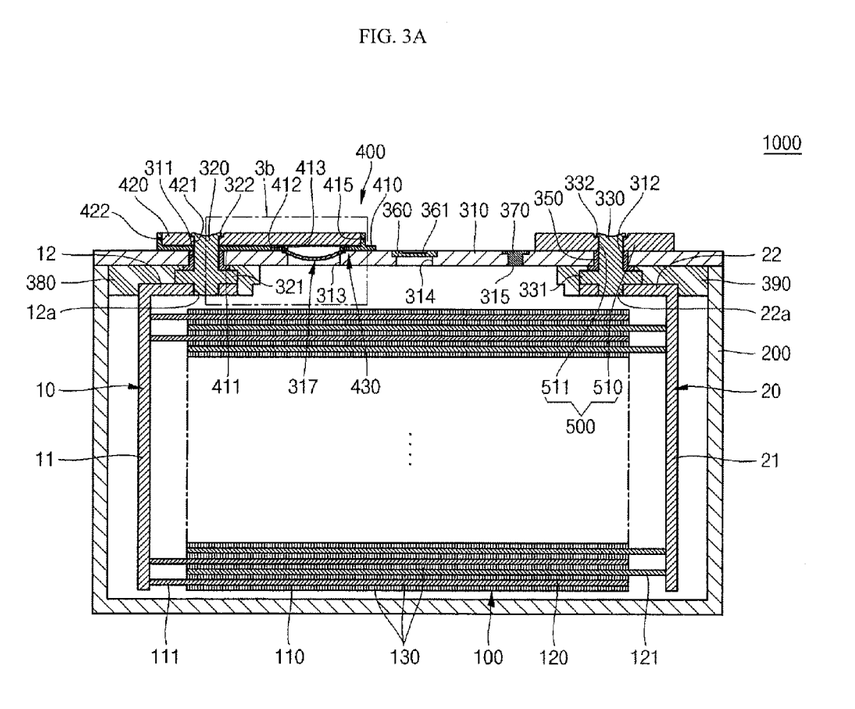
FIG. 3A is a cross-sectional view taken along the line 3a-3a of FIG. 1
Figure 3B:
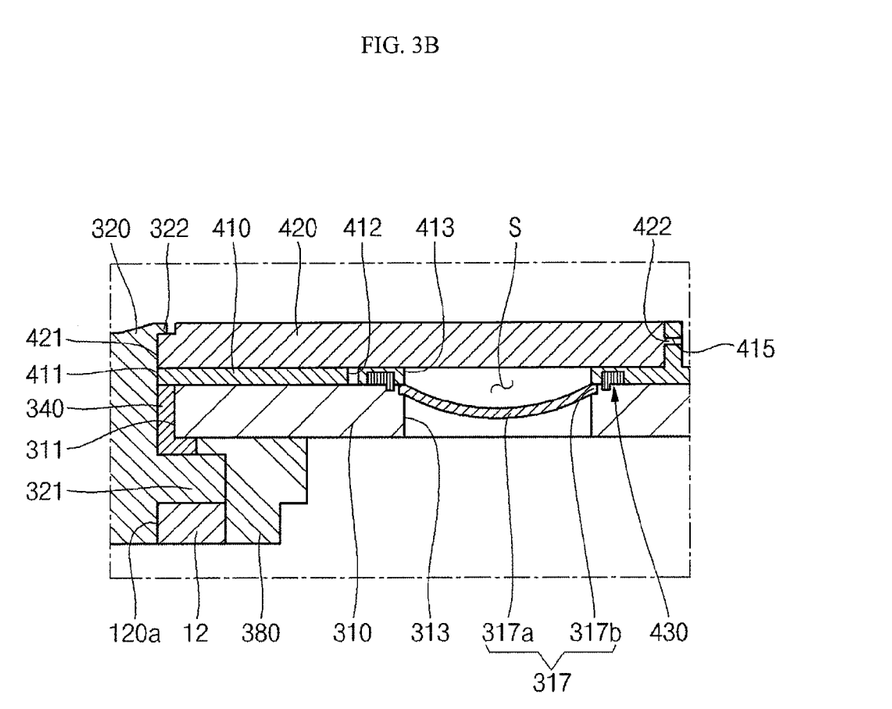
FIG. 3B is an enlarged cross-sectional view illustrating a portion 3b shown in FIG. 3A.

The inversion plate 317 is formed in the first short-circuit hole 313 of the cap plate 310. In FIGS. 3A and 3B, the inversion plate 317 is formed in the first short-circuit hole 313 of the cap plate 310, but aspects of the present invention are not limited thereto. In other words, the inversion plate 317 may also be formed in a second short-circuit hole 413 of an insulation plate 410.

The inversion plate 317 may include a downwardly convex round part 317a (i.e., the convex round part 317a generally protrudes towards the electrode assembly) and an edge part 317b fixed to a second short-circuit hole 313 of the insulation plate 410. In one embodiment, the inversion plate 317 is electrically connected to the cap plate 310 and has the same polarity as the cap plate 310.

When the internal pressure of the secondary battery 1000 exceeds a critical pressure due to overcharge, the round part 317a of the inversion plate 317 is inverted to protrude to be upwardly convex (i.e., it generally protrudes away from the electrode assembly), so that it makes contact with the first terminal plate 420, causing a short circuit.

In one embodiment, air is in a space S between the round part 317a and the first terminal plate 420. If the round part 317a is rapidly upwardly inverted, the air may escape to a region between the cap plate 310 and the insulation plate 410 through an air hole or opening 412 to be described later. Accordingly, the air existing in the space S may prevent the insulation plate 410 and the first terminal plate 420 from becoming spaced from each other.

The first fastening shaft 320 passes through the first fastening hole 311 of the cap plate 310 to be electrically connected to the first current collector plate 10. The first fastening shaft 320 may be shaped as a pillar. A riveting part 322 to be described later is formed at the outer circumference of an upper pillar exposed to an upper side of the cap plate 310, and a flange 331 to be described later is formed at the outer circumference of a lower pillar positioned at a lower side of the cap plate 310 to prevent the first fastening shaft 320 from being dislodged from the cap plate 310. A portion of the lower pillar of the first fastening shaft 320 positioned at the lower side of the cap plate 310 is fitted into the first fastening hole 12a of the first current collector plate 10.

The second fastening shaft 330 passes through the second fastening hole 312 of the cap plate 310 to be electrically connected to the second current collector plate 20. The second fastening shaft 330 has a flange 331 and a riveting part 332, which have the same configurations as those of the corresponding components of the first fastening shaft 320, and repeated descriptions thereof will be omitted. However, the second fastening shaft 330 may be electrically connected to the cap plate 310.

The first and second gaskets 340 and 350 are formed between each of the first fastening shaft 320 and the second fastening shaft 330 and the cap plate 310 using an insulating material and seal spaces between each of the first fastening shaft 320 and the second fastening shaft 330 and the cap plate 310. The first and second gaskets 340 and 350 prevent external moisture from permeating into the inside of the secondary battery 1000 and prevent an electrolyte contained in the secondary battery 1000 from flowing out.

The vent plate 360 is installed in the vent hole 314 of the cap plate 310 and has a notch 361 configured to be opened at a critical pressure. The plug 370 seals the electrolyte injection hole 315 of the cap plate 310.

The first and second insulation members 380 and 390 are formed between each of the first current collector plate 10 and the second current collector plate 20 and the cap plate 310, and prevent unnecessary short-circuits.

The first terminal assembly 400 includes an insulation plate 410, a first terminal plate 420 and a sealing member 430.

The insulation plate 410 includes a first fastening hole 411, an air hole or air opening 412, a second short-circuit hole 413, a first coupling protrusion 414 and a coupling hole 415 and is coupled to the top surface of the cap plate 310.

The first fastening hole 411 is a hole through which the first fastening shaft 320 passes, and the second short-circuit hole 413 is formed at one side of the cap plate 310 and located and sized to be the same as the first short-circuit hole 313.

The air hole 412 is formed to be spaced from the second short-circuit hole 413. If the round part 317a is rapidly upwardly inverted, the air may escape to a region between the cap plate 310 and the insulation plate 410 through the air hole 412. Accordingly, the air existing in the space S may prevent the insulation plate 410 and the first terminal plate 420 from becoming spaced from each other.

The first coupling protrusion 414 is inserted into the coupling groove 316 formed on the top surface of the cap plate 310, thereby firmly coupling the first terminal assembly 400 to the cap assembly 300.

The coupling hole 415 is formed on a side surface of the insulation plate 410 and a second coupling protrusion 422 of the first terminal plate 420 to be described later is coupled thereto, thereby firmly coupling the insulation plate 410 to the first terminal plate 420.

The first terminal plate 420 is coupled to the top surface of the insulation plate 410 and includes the first fastening hole 421 and the second coupling protrusion 422.

The first fastening hole 421 is a hole through which the first fastening shaft 320 passes. A top end of the first fastening shaft 320 is riveted to a top portion of the first fastening hole 421, forming the riveting part 322.

Figure 1:
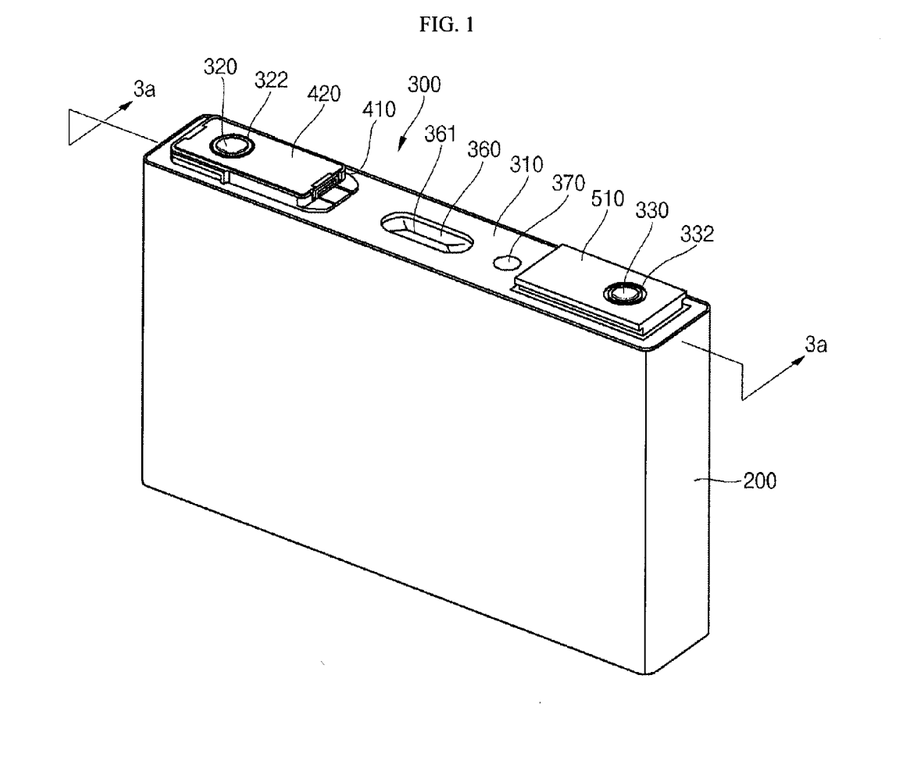
FIG. 1 is a perspective view of a secondary battery according to an embodiment of the present invention.
Figure 4:
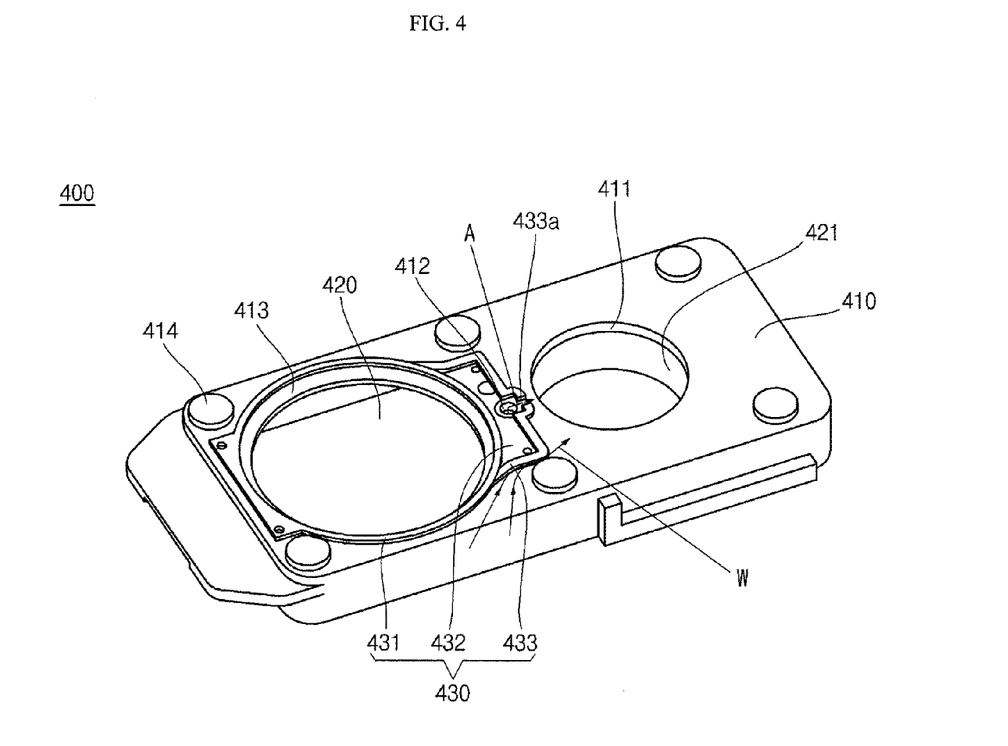
FIG. 4 is a perspective view illustrating a first terminal assembly of the secondary battery shown in FIG. 1.

FIG. 4 is a perspective view illustrating a first terminal assembly of the secondary battery shown in FIG. 1.

The sealing member 430 will now be described with reference to FIG. 4.

The sealing member 430 is formed between the cap plate 310 and the insulation plate 410 and includes a sealing ring 431, a rib 432 and a protrusion part 433.

The sealing ring 431 is formed to surround the edge of the second short-circuit hole 413 of the insulation plate 410. In other words, the sealing ring 431 seals a space between the insulation plate 410 and the cap plate 310, thereby preventing external dew condensation from penetrating into the secondary battery 1000 through the space and gathering on the inversion plate 317. Accordingly, the sealing ring 431 prevents the first terminal plate 420 and the inversion plate 317 from being electrically connected to cause a short circuit due to dew condensation, thereby suppressing deterioration and capacity reduction of the secondary battery 1000 and preventing internal components of the secondary battery 1000 from corroding due to the dew condensation. The sealing ring 431 may be made of an adhesive or rubber capable of increasing sealing efficiency and having an insulating property. In one embodiment, the sealing ring 431 is made of a thermoplastic elastomer (TPE) having good formation processability (i.e., it is easy to mold into a particular shape) and corrosion resistance and elasticity. However, the present invention does not limit the material of the sealing ring 431 to the material disclosed herein. In one embodiment, the short circuit, which is caused when the first terminal plate 420 and the inversion plate 317 are electrically connected due to dew condensation, may be negligible so that a microcoupure.

The rib 432 extends from one side of the sealing ring 431 and is formed to surround the edge of the air hole 412.

The protrusion part 433 protrudes from the edge of the rib 432 to have a predetermined height. Referring to FIG. 4, the protrusion part 433 may prevent external moisture W from penetrating into the secondary battery 1000 through the air hole 412.

In other words, the protrusion part 433 is formed to have substantially the same height as the sealing ring 431, thereby preventing internal components of the secondary battery 1000 from corroding due to dew condensation.

In one embodiment, a channel 433*a* is formed at about a central region of the protrusion part 433 to be oriented toward the air hole 412. The channel 433*a* is provided for the purpose of providing a movement path of the air A escaped through the air hole 412 in a case where the inversion plate 317 is upwardly inverted.

The second terminal assembly 500 includes a second terminal plate 510 and a second fastening hole 511 passing through the second terminal plate 510.

The second terminal plate 510 is coupled to the top surface of the cap plate 310. In one embodiment, the second terminal plate 510 is physically coupled to the top surface of the cap plate 310 by, for example, welding. However, the second terminal plate 510 may also be mechanically coupled to the top surface of the cap plate 310 using a coupling protrusion and a coupling groove provided between the second terminal plate 510 and the cap plate 310. The second terminal plate 510 may be electrically connected to the cap plate 310 to have the same polarity with the cap plate 310.

The second fastening hole 511 is a hole formed to allow the second fastening shaft 330 to pass therethrough. The first fastening hole 421 is a hole through which the first fastening shaft 320 passes. A top end of the second fastening shaft 330 is riveted to a top portion of the second fastening hole 511, forming the riveting part 332.

A secondary battery according to another embodiment of the present invention will now be described.

Figure 5:
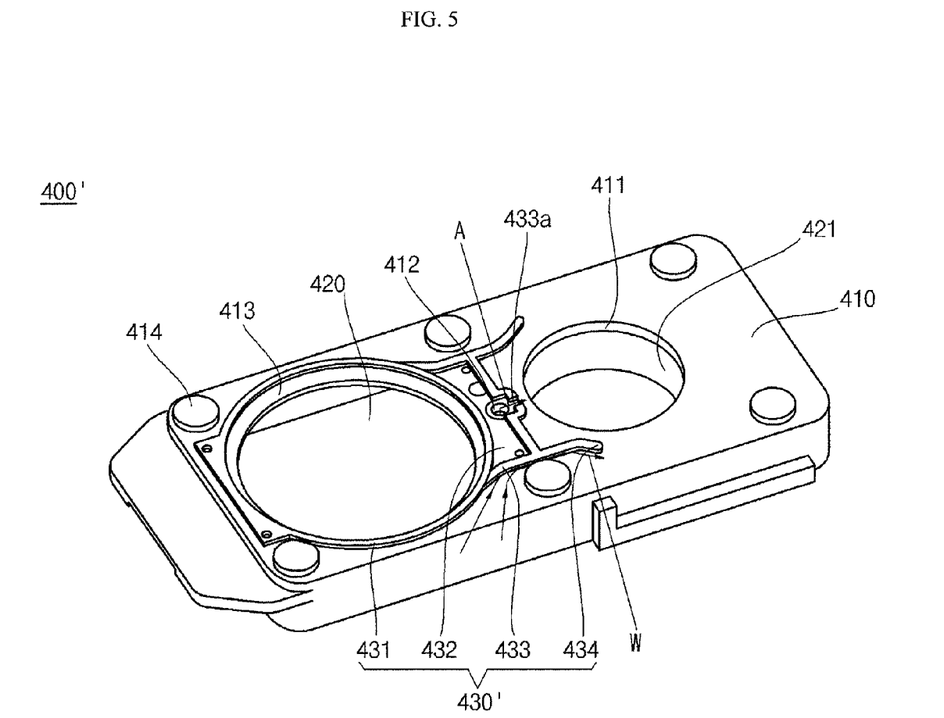
FIG. 5 is a perspective view illustrating a first terminal assembly of a secondary battery according to another embodiment of the present invention.

FIG. 5 is a perspective view illustrating a first terminal assembly of a secondary battery according to another embodiment of the present invention.

Referring to FIG. 5, in the secondary battery according to another embodiment of the present invention, the first terminal assembly 400' includes an insulation plate 410, a first terminal plate 420 and a sealing member 430'.

In other words, the first terminal assembly 400' of the secondary battery according to another embodiment of the present invention is different from the first terminal assembly 400 of the secondary battery according to the previous embodiment with respect to a configuration of the sealing member 430'. Thus, the following description of the first terminal assembly 400' of the secondary battery according to the present embodiment will focus on the sealing member 430'. In addition, the functional components of the first terminal assembly 400' of the secondary battery shown in FIG. 5, which are the same as or similar to those of the first terminal assembly 400 of the secondary battery shown in FIG. 4 are denoted by the same reference numerals, and detailed descriptions thereof will be omitted.

The sealing member 430' of the first terminal assembly 400' is formed between the cap plate 310 and the insulation plate 410 and includes a sealing ring 431, a rib 432, a protrusion part 433 and a protruding extension part 434.

The sealing ring 431, the rib 432 and the protrusion part 433 according to still another embodiment are substantially the same as the sealing ring 431, the rib 432 and the protrusion part 433 shown in FIG. 4 in view of configurations and functions, and repeated descriptions will be omitted.

The protruding extension part 434 is formed to extend from the protrusion part 433 to the opposite side of a short-circuit hole. In one embodiment, as shown in FIG. 5, the protruding extension part 434 further extends from opposite edges of an end of the protrusion part 433 in a direction substantially parallel to a long side surface of the insulation plate 410.

In other words, the protrusion part 433 and the protruding extension part 434 are formed to protrude to have a substantially 'H' shape. Referring to FIG. 5, the protrusion part 433 and the protruding extension part 434 increase a movement path of external moisture W, compared to the protrusion part 433 shown in FIG. 4, thereby further preventing the external moisture W from flowing in through the air hole 412.

In one embodiment, the protruding extension part 434 and the sealing ring 431 have substantially the same height, thereby preventing internal components of the secondary battery due to dew condensation.

A secondary battery according to still another embodiment of the present invention will now be described.

Figure 6:
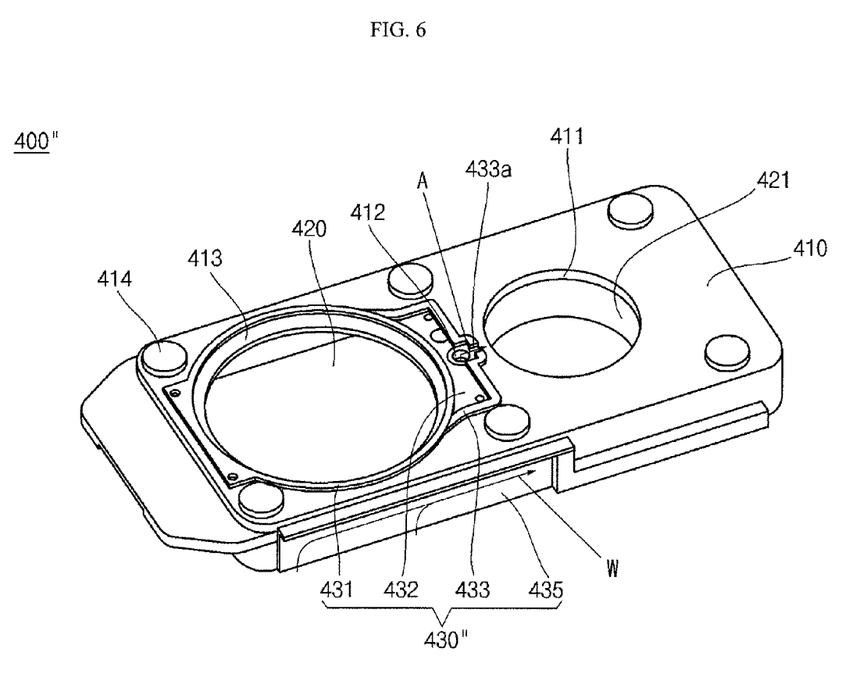
FIG. 6 is a perspective view illustrating a first terminal assembly of a secondary battery according to still another embodiment of the present invention.

FIG. 6 is a perspective view illustrating a first terminal assembly of a secondary battery according to still another embodiment of the present invention.

Referring to FIG. 6, the first terminal assembly 400" of a secondary battery according to still another embodiment of the present invention includes an insulation plate 410, a first terminal plate 420 and a sealing member 430".

In other words, the first terminal assembly 400" of a secondary battery according to still another embodiment of the present invention is different from the first terminal assembly 400 of the secondary battery according to the previous embodiment in view of a configuration of the sealing member 430". Thus, the following description of the first terminal assembly 400" of a secondary battery according to still another embodiment of the present invention will focus on the sealing member 430". In addition, the functional components of the first terminal assembly 400" of the secondary battery shown in FIG. 6, which are the same as or similar to those of the first terminal assembly 400 of the secondary battery shown in FIG. 4 are denoted by the same reference numerals, and detailed descriptions thereof will be omitted.

The sealing member 430" of the first terminal assembly 400" is formed between the cap plate 310 and the insulation plate 410 and includes a sealing ring 431, a rib 432, a protrusion part 433 and a sealing wall 435.

The sealing ring 431, the rib 432 and the protrusion part 433 according to still another embodiment are substantially the same as those shown in FIG. 4 in view of configurations and functions, and repeated descriptions will be omitted.

The sealing wall 435 is coupled to the outer surface of the insulation plate 410 and is made of an elastic material. In other words, the sealing wall 435 closes a gap between the insulation plate 410 and the cap plate 310, thereby primarily preventing external moisture W from penetrating into the gap between the insulation plate 410 and the cap plate 310.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery, comprising:
   an electrode assembly;
   a case accommodating the electrode assembly;
   a cap plate sealing the case and comprising an inversion plate; and
   an insulation plate on the cap plate and having a short-circuit hole generally corresponding to the inversion plate and an air opening spaced from the short-circuit hole and fluidly connected to a top surface of the cap plate;
   a terminal plate coupled to a top surface of the insulation plate and electrically connected to the electrode assembly; and a terminal assembly comprising a sealing member coupled to a bottom surface of the insulation plate and formed to encompass the short-circuit hole and the air opening, wherein the sealing member comprises a sealing ring extending around an edge of the short-circuit hole, a rib extending from one side of the sealing ring and surrounding at least a portion of a periphery of the air opening, and a protrusion part protruding away from the rib in a thickness direction.

2. The secondary battery of claim 1, wherein the sealing ring and the protrusion part have substantially the same height.

3. The secondary battery of claim 2, wherein a channel is formed in the protrusion part.

4. The secondary battery of claim 2, wherein a channel oriented toward the air opening is formed in the protrusion part.

5. The secondary battery of claim 2, wherein the protrusion part has an 'H' shape.

6. The secondary battery of claim 1, wherein the sealing member further comprises an extension part protruding from the protrusion part generally away from the short-circuit hole.

7. The secondary battery of claim 1, wherein the sealing member further comprises a sealing wall coupled to the insulation plate.

8. The secondary battery of claim 1, wherein the sealing member comprises a thermoplastic elastomer.

9. The secondary battery of claim 1, wherein the cap plate comprises at least one coupling groove on a top surface, and wherein the insulation plate comprises at least one coupling protrusion on the bottom surface corresponding to the at least one coupling groove.

10. The secondary battery of claim 1, wherein the insulation plate has at least one coupling hole formed on an inner surface, and wherein the first terminal plate comprises at least one coupling protrusion formed at a region of an outer surface corresponding to the at least one coupling hole.

11. The secondary battery of claim 1, further comprising a fastening shaft electrically connected to the electrode assembly through a current collector plate, wherein the fastening shaft is electrically connected to the terminal plate.

12. The secondary battery of claim 11, wherein the fastening shaft is riveted on to the terminal plate.

13. The secondary battery of claim 1, wherein the inversion plate includes a convex round part extending generally towards the electrode assembly and an edge part fixed to the insulation plate.

* * * * *